United States Patent
Chen et al.

(10) Patent No.: US 7,614,870 B2
(45) Date of Patent: Nov. 10, 2009

(54) INJECTION UNIT OF A TWO-STAGE INJECTION MOLDING MACHINE

(75) Inventors: Ming-Chi Chen, Hsinchu Hsien (TW);
 Wen-Hung Feng, Hsinchu Hsien (TW);
 Cheng-Jien Chen, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 364 days.

(21) Appl. No.: 11/607,068

(22) Filed: Dec. 1, 2006

(65) Prior Publication Data

US 2007/0128309 A1 Jun. 7, 2007

(30) Foreign Application Priority Data

Dec. 5, 2005 (TW) .............................. 94142735 A

(51) Int. Cl.
 *B29C 45/48* (2006.01)
(52) U.S. Cl. ...................... 425/557; 425/561
(58) Field of Classification Search ................ 425/557, 425/558, 559, 560, 561
 See application file for complete search history.

(56) References Cited

U.S. PATENT DOCUMENTS 4,557,683 A * 12/1985 Meeker et al. ............. 425/557
5,246,660 A 9/1993 Tsutsumi
5,421,712 A 6/1995 Laing et al.
5,863,567 A 1/1999 Klaus
6,168,417 B1 1/2001 Takahashi et al.
6,247,913 B1 6/2001 Shibuya et al.
6,376,940 B1 4/2002 Shibuya et al.
6,866,496 B2 3/2005 Morita et al.

FOREIGN PATENT DOCUMENTS

| JP | 90102269 | 4/1997 |
| JP | 11-207795 | 3/1999 |
| JP | 2005-20933 | 1/2005 |

* cited by examiner

*Primary Examiner*—Tim Heitbrink
(74) *Attorney, Agent, or Firm*—Birch, Stewart, Kolasch & Birch, LLP

(57) ABSTRACT

The present invention relates to an injection unit of a two-stage injection molding machine having an injection device and a meter device for providing plastic to the injection device. The injection motor of the injection device is secured to the base and does not move along with the injection linkage member so as to decrease the movement momentum and improve the injection response and acceleration capability. Additionally, the injection device can adopt a plurality of injection motors for meeting the injection capability requirement without employing high power injection motors. The length of the injection molding machines is relatively shortened, thus the problem of the prior arts is solved.

33 Claims, 4 Drawing Sheets

INJECTION UNIT OF A TWO-STAGE INJECTION MOLDING MACHINE

FIELD OF THE INVENTION

The present invention relates to injection molding technologies, and more specifically, to an injection unit of a two-stage injection molding machine.

BACKGROUND OF THE INVENTION

In the development of electronic injection molding machines, the large-scale requirement is one of the major trends thereof. If a traditional in-line injection frame is used in a large-scale electronic injection molding machine, a high power injection motor shall be firstly chosen to match the injection capability of the injection machine, however which will relatively greatly increase the volume and cost thereof. Secondly, during the course of injection, the in-line injection frame needs to drive the injection motor and/or meter motor of the injection move plate, so that the in-line injection motor needs to bear the movement momentum of the whole body of the injection frame, leading to a not good injection response and acceleration capability of the frame which affects the working efficiency thereof. Furthermore, because the in-line injection motor is used, the check ring on the in-line injection frame, during the course of injection, will cause an adverse flow of the plastic material which remarkably affects the precise of the injection amount. The technology of the electronic injection molding machine is disclosed in U.S. Pat. No. 5,421,712, No. 5,863,567 and No. 6,866,496.

As shown in FIG. 1 and FIG. 2, U.S. Pat. No. 5,421,712 discloses an in-line electronic injection frame, which employs the same injection rod to process injection and meter, wherein an injection motor 13 and a meter motor 14 are arranged on a moving plate 123 for respectively controlling the injection and meter of the injection rod. However, this prior art is configured to employ a single injection motor 13 which leads to an insufficiency of injection power, so that which can not meet the requirement of large-scale electronic injection machine. Furthermore, during the course of injection of this prior art, the injection motor 13 and meter motor 14 arranged on the moving plate 123 move together with the moving plate 123, the movement momentum is thus increased which affects the injection response and acceleration capability.

As shown in FIG. 3, U.S. Pat. No. 6,866,496 discloses a two-plate in-line electronic injection machine. The two-plate design successfully employs a plurality of parallel injection motors 317 to enhance the injection capability. However, the moving plate 313 is still configured to employ a meter motor 312, the problem of over high movement momentum of the injection frame, which affects the injection response and acceleration capability, is still can not be solved. Furthermore, during the course of injection, the check ring design of the in-line injection frame will also cause a adverse flow of the plastic material which affects the precise of the injection amount.

As shown in FIG. 4, U.S. Pat. No. 5,863,567 discloses a two-stage electronic injection machine, which respectively employs an injection rod and a meter screw to process injection and meter. During the course of injection, only the injection motor 468 move together with the transmission mechanism, thus the movement momentum there of is relatively small so that the injection response and acceleration capability thereof are slightly improved, yet there is still room for improvement. However, in this prior art, the single frame of the injection motor 468 can not meet the requirement of the injection capability of large-scale electronic injection machine either.

It can be learned from the above published prior arts that, in the electronic injection molding machine, the design adopting a single injection motor can not meet the injection capability requirements of large-scale injection machine. Furthermore, during the course of injection, the injection motor, or further the meter motor on the injection moving plate needs to be driven at the same time, thus the injection motor bears the movement momentum of the injection machine, which affects the injection response and acceleration capability, therefore the working efficiency thereof will be affected and power will be wasted. Simultaneously, because a single injection motor is adopted, during the course of injection, the check ring on the in-line injection frame will cause an adverse flow of the plastic material which affects the precise of the injection amount. Although U.S. Pat. No. 5,863,567 discloses that an injection rod and a meter screw are used to respectively process injection and meter, the problem of unsatisfied injection response and acceleration capability is still unsolved.

Consequently, how to solve the problem of the prior arts has become a take in this field.

SUMMARY OF THE INVENTION

Regarding the drawbacks of the abovementioned conventional technologies, an objective of the present invention is to provide an injection unit of a two-stage injection molding machine, which decreases the movement momentum thereof for enhancing the injection response and acceleration capability.

Another object of the present invention is to provide an injection unit of a two-stage injection molding machine, which has a short length.

Still another object of the present invention is to provide an injection unit of a two-stage injection molding machine, which improves the precise of the injection amount of the plastic material.

Still another object of the present invention is to provide an injection unit of a two-stage injection molding machine, which meets the application requirement.

Still another object of the present invention is to provide an injection unit of a two-stage injection molding machine without any high power injection motor.

In accordance with the above and other objectives, the present invention proposes an injection unit of a two-stage injection molding machine, comprising: an injection device including a hollow base having a first side and an opposing second side, an material injection pipe secured to the first side and having an injection rod, an injection linkage member arranged inside the hollow base and linking the injection rod, and at least an injection motor secured to the second side for driving the injection linkage member; and a meter device comprising a material meter pipe linking the material injection pipe and having a meter screw, and a meter motor secured to the second side for driving the meter screw.

In the above injection unit of the two-stage injection molding machine, the meter device further includes a runner linking the material meter pipe and the material injection pipe. Preferably, a check shaft is arranged in the runner for preventing adverse flow. Additionally, the meter device further includes a hopper for providing plastic to the material meter pipe.

The injection motor of the injection device includes a plurality of injection motors secured to the second side for synchronously driving the injection linkage member. The injection motors adopt a transmission mechanism to drive the injection linkage member. Preferably, the transmission mechanism at least includes a guide screw linking the injection motor, and a nut fixedly arranged on the injection linkage member. Additionally, the transmission mechanism further includes a coupling for linking the injection motor and the guide screw. In an embodiment, the guide screw is a ball screw, and the screw nut is a ball screw nut. In an alternative embodiment, the injection motor is motor, so that the transmission mechanism needs not be employed to link the injection motor and the injection linkage member.

The first side of the hollow base is a front plate arranged at a front side, and the second side is a rear plate arranged at a rear side. The injection rod extends through the first side of the hollow base and links the injection linkage member in the hollow base. In a preferred embodiment, the injection device includes a plurality of material injection pipes secured to the first side and having injection rods, each of the injection rods of the material injection pipe links the injection linkage member.

The present invention further proposes an injection unit of a two-stage injection molding machine, which includes an injection device having a base, an material injection pipe secured to a front side of the base and having an injection rod, an injection linkage member arranged at a rear side of the base and linking the injection rod, and at least an injection motor secured to the front side of the base for driving the injection linkage member; and a meter device having a material meter pipe linking the material injection pipe and having a meter screw, and a meter motor secured to the rear side of the base for driving the meter motor of the meter screw.

In the above injection unit of the two-stage injection molding machine, the meter device further includes a runner linking the material meter pipe and the material injection pipe. Preferably, a check shaft is arranged in the runner for preventing adverse flow. Additionally, the meter device further includes a hopper for providing plastic to the material meter pipe.

The injection motor of the injection device includes a plurality of injection motors secured to the front side of the base for synchronously driving the injection linkage member. The injection motors adopt a transmission mechanism to drive the injection linkage member. Preferably, the transmission mechanism at least includes a guide screw linking the injection motor, and a nut fixedly arranged on the injection linkage member and engaging with the screw. Additionally, the transmission mechanism further includes a coupling for linking the injection motor and the guide screw. In an embodiment, the guide screw is a ball screw, and the nut is a ball screw nut. In an alternative embodiment, the injection motor is motor, so that the transmission mechanism needs not be employed to link the injection motor and the injection linkage member.

The injection rod extends through the base to the rear side and links the injection linkage member at the rear side of the base. Additionally, in a preferred embodiment, the injection device includes a plurality of material injection pipes secured to the front side of the base and having injection rods, each of the injection rods of the material injection pipe links the injection linkage member.

After reading the present specification, those skilled in the art can better understand other advantages or other objects of the patent application as claimed in the claims.

Compared with the prior arts, the injection unit of the two-stage injection molding machine of the present invention mainly employ the design of securing the injection motors of the injection device, which does not move along with the injection linkage member, to the base, so as to lower the movement momentum and improve the injection response and acceleration capability. Additionally, the injection device can adopt a plurality of injection motors to meets the injection capability requirement without using high power injection motors, and relatively shorten the length of the injection molding machine. Besides the injection motor and meter motor are employed to respectively perform injection and meter, the design of check shaft can be employed to prevent the reverse flow of the plastic material caused by the injection, which relatively improves the precise of the amount of injection of the plastic material, thus the problem of the prior arts is solved.

DETAILED DESCRIPTION OF THE PREFERRED EMBODIMENTS

The following embodiments are used to describe the present invention; those skilled in the art can easily understand other advantages and functions of the present invention via the contents disclosed in the description. Various embodiments can be employed in the present invention; and the detail of the description can be based on and employed in various points of view, which can be modified within the scope of the present invention.

It is to be noted that, the following figures are all simplified schematic figures, which are employed to schematically illustrate the features of the present invention, wherein only those elements relates to the feature of the present invention are shown, the number, figure and size of the elements are not strictly identical to the practical embodiments; in practical embodiments, the types, number and proportion can be different, and the arrangement can be more complicated.

Figure 1:
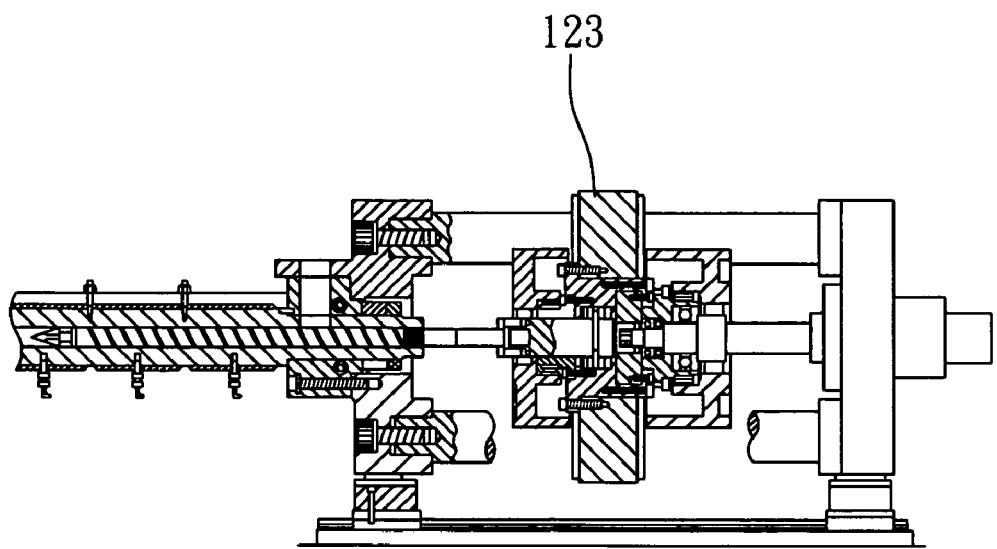
FIG. 1 is a side section view of the U.S. Pat. No. 5,421,712.
Figure 2:
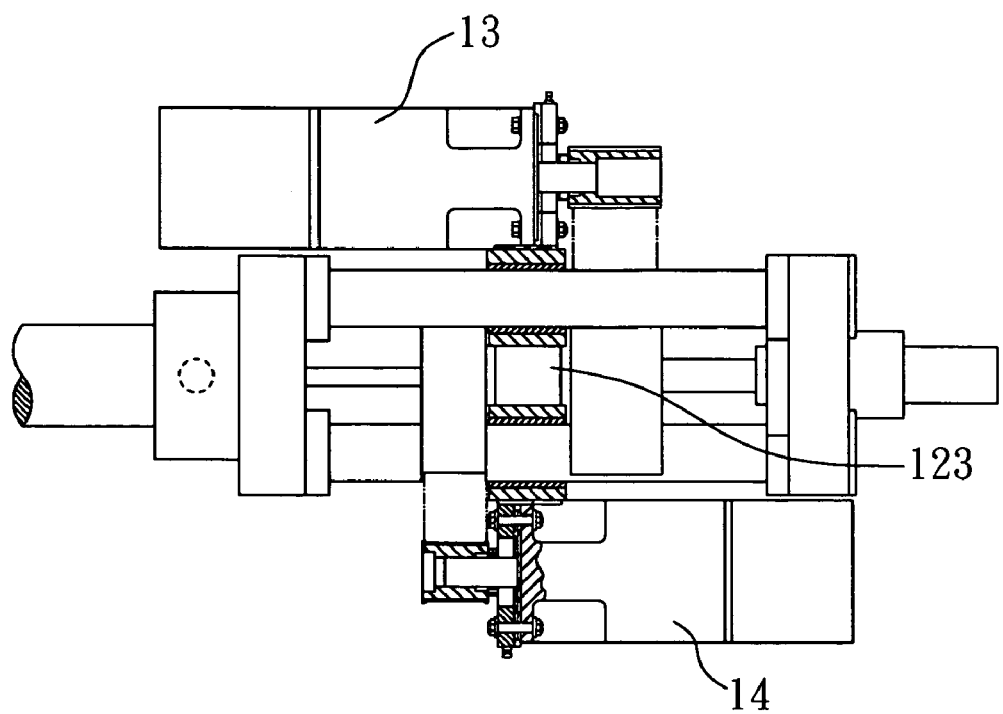
FIG. 2 is a top, partial section view of the U.S. Pat. No. 5,421,712.
Figure 3:
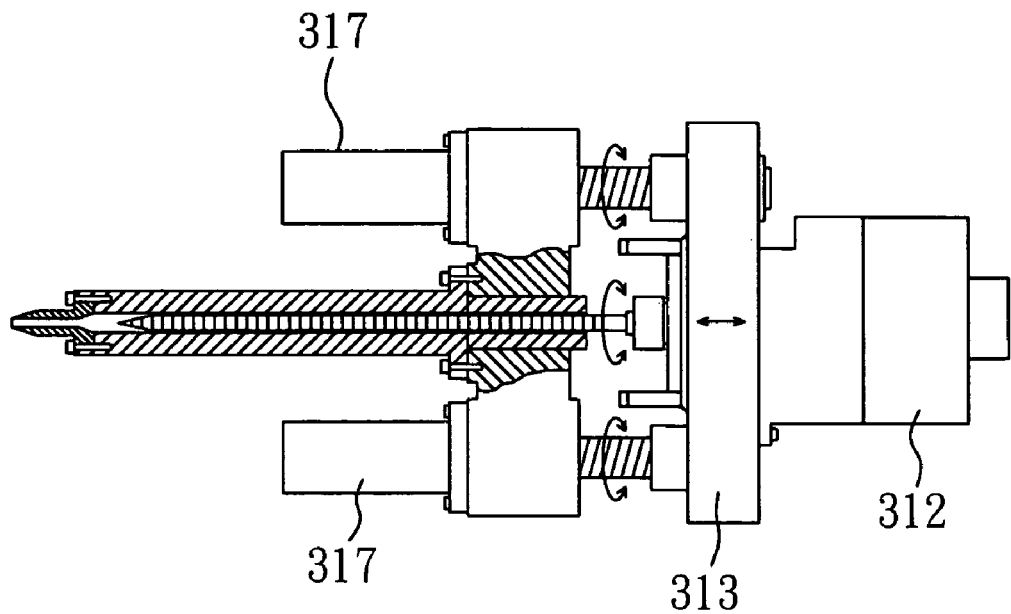
FIG. 3 is a top section view of the U.S. Pat. No. 6,866,496.
Figure 4:
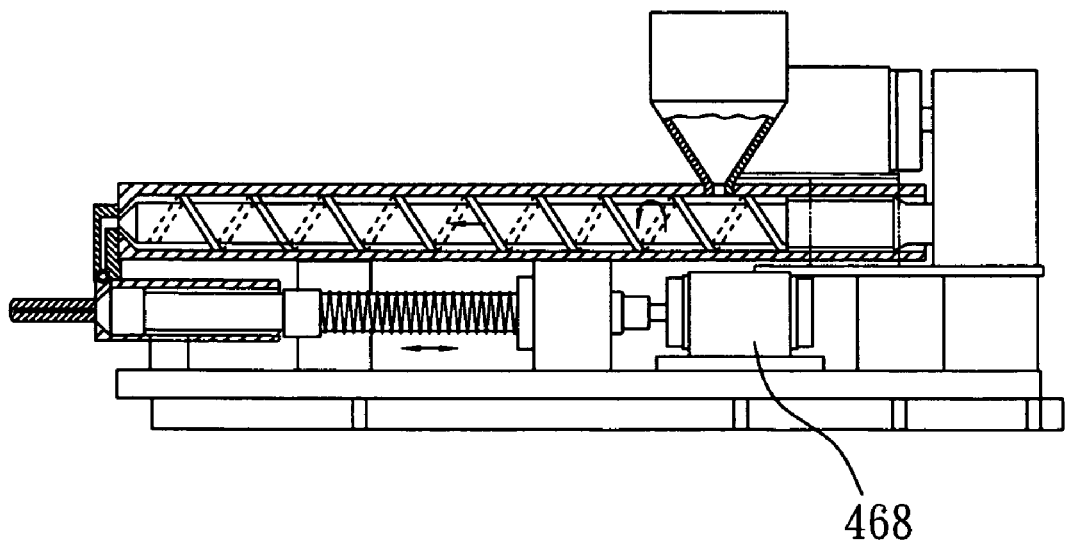
FIG. 4 is a side section view of the U.S. Pat. No. 5,863,567.
Figure 5:
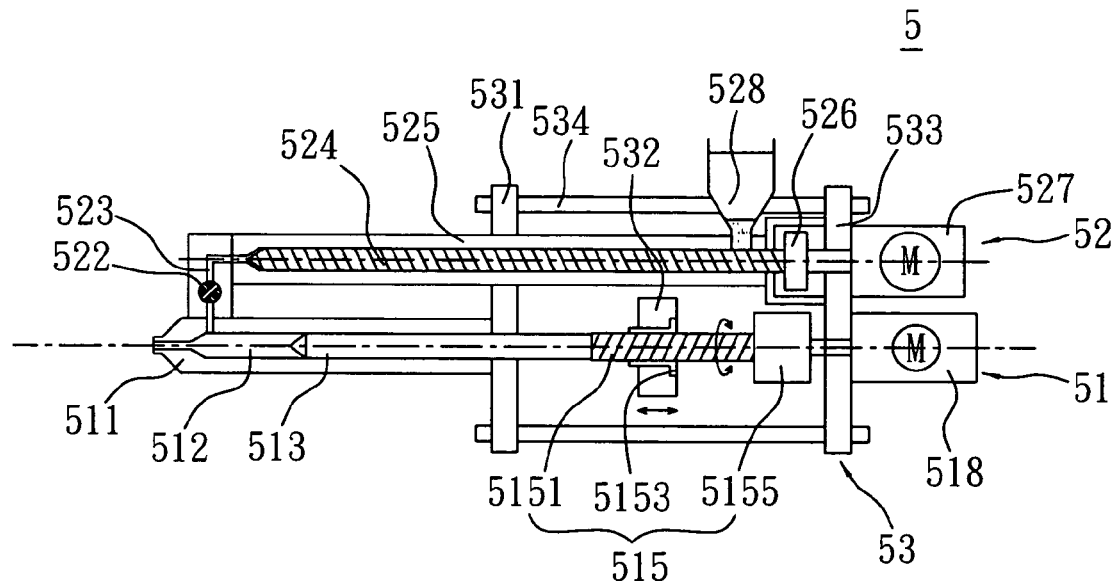
FIG. 5 is a side view of an injection unit of a two-stage injection molding machine of a first embodiment according to the present invention.
Figure 6:
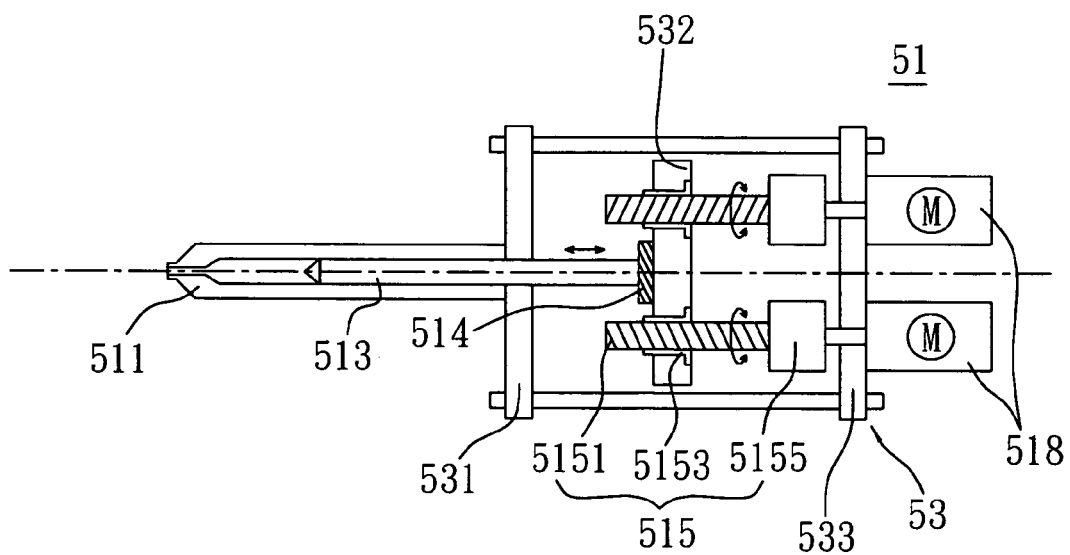
FIG. 6 is a top view of the injection device shown in FIG. 5.

FIG. 5 is a side view of an injection unit 5 of a two-stage injection molding machine of a first embodiment according to the present invention. FIG. 6 is a top view of a corresponding injection device 51. The injection unit 5 comprises the injection device 51 and a meter device 52. The injection device 51 comprises a hollow base 53 having a first side and an second side opposite to the first side, a material injection pipe 511 secured to the first side of the hollow base 53 and having an injection rod 513, at least an injection linkage member 532 installed inside the hollow base 53 and linked to the injection rod 513, and at least an injection motor 518 secured to the second side of the hollow base 53 for driving the injection linkage member 532. The meter device 52 comprises a material meter pipe 525 linked to the material injection pipe 511 and having a meter screw 524, and a meter motor 527 secured to the second side of the hollow base 53 for driving the meter screw 524.

As shown in FIG. 5, the meter device 52 is arranged in the hollow base 53, and further comprises a runner 523 for linking the material meter pipe 525 and the material injection pipe 511. A check shaft 522 is arranged in the runner 523 for preventing the adverse flow of the injection plastic material. Additionally, the meter device 52 further comprises a hopper 528 for providing plastic material to the material meter pipe 525. The meter motor 527 links the meter screw 524 via a coupling 526. Plastic material is put into the material meter pipe 525 by the hopper 528, driven by the meter motor 527, and smelted by the meter screw 524. The melt passes through the material meter pipe 525 and the check shaft 522, and reaches the material injection pipe 511 of the injection device 51 via the runner 523, for the injection of the injection device 51.

The hollow base 53 is employed for the arrangement of the injection device 51 and the meter device 52. The first side of the hollow base 53 is formed by a front plate 531 at a front side of the hollow base 53, and the second side of the hollow base 53 is formed by a rear plate 533 at a rear side of the hollow base 53. The material injection pipe 511 of the injection device 51 is secured to the front plate 531, the injection motor 518 is secured to the rear plate 533, and the injection rod 513 extends through the front plate 531 and links the injection linkage member 532 arranged in the hollow base 53. The hollow base 53 further comprises a linkage rod 534 linking the front plate 531 and the rear plate 533.

Referring to FIG. 6 cooperatively, the injection device 51 comprises two injection motors 518 connected in parallel to each other and secured to the rear plate 533 of the hollow base 53 for synchronously driving the injection linkage member 532 to move forward or backward. The injection motors 518 adopt a transmission mechanism 515 to drive the injection linkage member 532. The transmission mechanism 515 at least comprises a guide screw 5151 linking the injection motors 518, and a nut 5153 fixedly arranged on the injection linkage member 532 and engaging with the guide screw 5151. In addition, the transmission mechanism 515 further comprises a coupling 5155 linking the injection motor 518 and the guide screw 5153. In the first embodiment, the guide screw 5151 is a ball screw, and the nut 5153 is a ball screw nut.

In the practical application of the injection unit 5 of the two-stage injection molding machine of the present invention, the meter motor 527 secured to the rear plate 533 links the meter screw 524 via the coupling 526. The meter motor 527 drives the meter screw 524 to cut, melt and smelt the plastic particles when the plastic material is put into the material meter pipe 525 by the hopper 528 for forming the melt. After the check shaft 522 opened, the melt is driven via the runner 523 to the material injection pipe 511 of the injection device 51. At the same time, the injection rod 513 has synchronously moved backward to a predetermined injection start position. A load cell 514 arranged at a rear portion of the injection rod 513 meter a back pressure of the melt. Once the melt reaches the predetermined position and pressure, the check shaft 522 is closed so as to finish the measure of the melt. The load cell 514 arranged at the rear portion of the injection rod 513 directly meters the pressure of the melt during the course of injection or meter, so as to greatly lower the lost caused in the meter of pressure and improve the precise of the pressure control.

After the meter, each of the injection motors 518 (in the first embodiment, there are two injection motors) synchronously rotates the linked guide screw 5151. The guide screw 5151 is rotate to generate movement relative to the nut 5153, further drives the injection linkage member 532 to linearly move, and synchronously drives the injection rod 513 to move within the material injection pipe 511 for achieving the forward movement for injection and the backward movement for measure.

Because the injection unit 5 of the two-stage injection molding machine of the present invention adopts a configuration of two-stage injection, and only the injection linkage member 532 moves during the course of injection, the injection motor 518 only provides a pushing power to the injection rod 513 and does not bear extra loads. Thus the movement momentum of the injection device 51 is greatly reduced, which better improves the injection response and acceleration capability of the mechanical structure compared to ordinary in-line injection configuration. Furthermore, the configuration of the two parallelly connected injection motor 518 synchronously driving the injection better meets the requirement of injection capability of large-scale injection machine, and provides higher injection speed ad injection pressure. Additionally, the check shaft 522 can better ensure the status of the melt during the course of measure and injection so as to improve the precise of the amount of injection and the pressure control.

Although in the first embodiment the transmission mechanism 515 is employed to link the injection motor 518 and the injection linage member 532, those skilled in the art understands that, the movement of the injection linkage member 532 can be directly controlled when a motor is adopted in the injection motor 518, and there's no need to link the injection motor 518 and the injection linkage member 532 via the transmission mechanism 515; that is, it is not absolutely necessary to employ the transmission mechanism 515.

Additionally, although two injection motors 518 are employed for synchronously driving in the first embodiment, a number of the injection motors 518 can also be selected in accordance with the practical requirements of the injection response and acceleration capability in other embodiments. Thus the application requirements of large-scale injection molding machine can be met without employing high power large-scale motors, the cost of the injection molding machine can be relatively reduced, and the length of the injection molding machine can be relatively shortened.

Furthermore, although a single material injection pipe 511 in employed in the first embodiment, the injection device can also comprise a plurality of material injection pipes 511 secured to the front plate 531 (the first side) of the hollow base 53 and having the injection rods 513. The injection rods 513 are all linked to the injection linkage member 532, thus a single injection linkage member 532 can be used in the injection of the injection rods 513.

Figure 7:
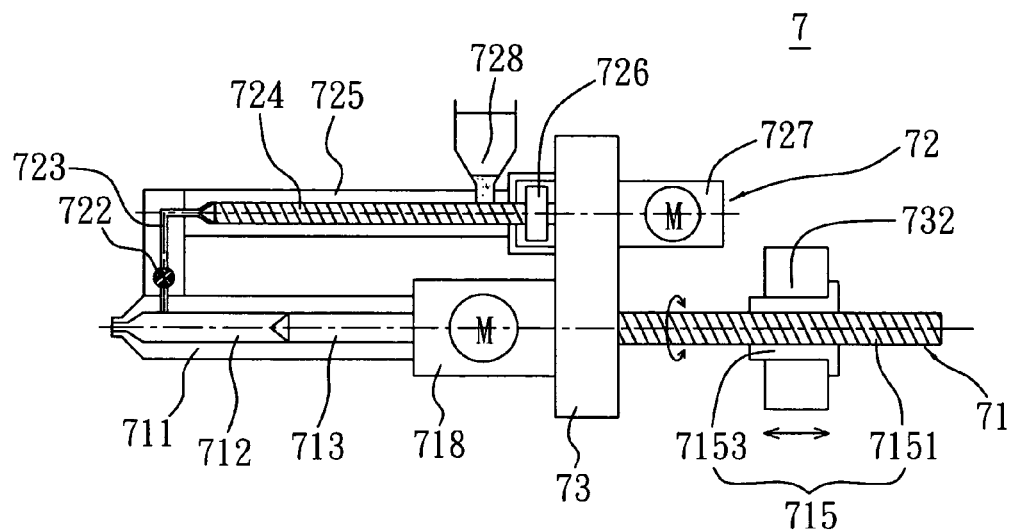
FIG. 7 is a top view of an injection unit of a two-stage injection molding machine of a second embodiment according to the present invention.
Figure 8:
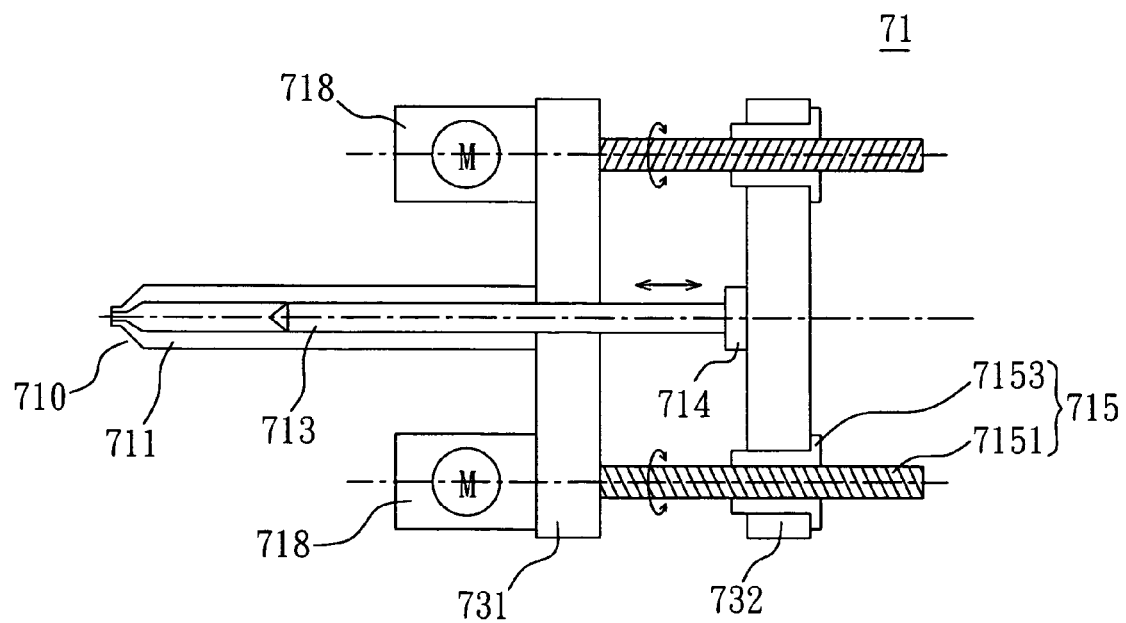
FIG. 8 is top view of the injection device shown in FIG. 7.

FIG. 7 is a side view of an injection unit 7 of the two-stage injection molding machine of a second embodiment according to the present invention. FIG. 8 is a top view of a corresponding injection device 71. The injection unit 7 of the two-stage injection molding machine of the second embodiment comprises the injection device 71 and a meter device 72. The injection device 71 comprises a base 73, a material injection pipe 711 secured to a front side of the hollow base 53 and having an injection rod 513, at least an injection linkage member 532 secured to the base 73 and having an injection rod 713, an injection linkage member 732 arranged at a rear side of the base and linking the injection rod 713, and at least an injection motor 718 secured to the front side of the base 73 for driving the injection linkage member 732. The meter device 72 comprises a material meter pipe 725 linking the material injection pipe 711 and having a meter screw 724, and a meter motor 727 secured to the rear side of the base 73 for driving the meter screw 724.

As shown in FIG. 7, the meter device 72 is arranged on the base 73, and further comprises a runner 723 for linking the material meter pipe 725 and the material injection pipe 711. A check shaft 722 is arranged in the runner 723 for preventing the adverse flow of the injection plastic material. Additionally, the meter device 72 further comprises a hopper 728 for providing plastic material to the material meter pipe 725. The meter motor 727 links the meter screw 724 via a coupling 726. Plastic material is put into the material meter pipe 725 by the hopper 728, driven by the meter motor 727, and smelted via the meter screw 724. The melt passes through the material meter pipe 725 and the check shaft 722, and reaches the material injection pipe 711 of the injection device 71 via the runner 723, for the injection of the injection device 71.

The base 73 is employed to arrange the injection device 71 and the meter device 72. The material injection pipe 711 of the injection device 71 is secured to the front side of the base 73; the injection motor 718 is also secured in dislocation to the front side of the base 73. The injection rod 713 extends through the base 73 and links the injection linkage member 732 at the rear side of the base 73.

Referring to FIG. 6 cooperatively, the injection device 71 comprises two injection motors 718 connected in parallel to each other and secured to the front side of the base 73 for synchronously driving the injection linkage member 732, and driving the injection moving plate 732 to move forward or backward. The injection motor 718 adopts a transmission mechanism 715 to drive the injection linkage member 732. The transmission mechanism 715 at least comprises a guide screw 7151 linking the injection motors 718, and a nut 7153 fixedly arranged on the injection linkage member 732 and engaging with the guide screw 7151. In the second embodiment, the guide screw 7151 is a ball screw, and the nut 7153 is a ball screw nut.

In the practical application of the injection unit 5 of the two-stage injection molding machine of the present embodiment, the meter motor 727 drives the meter screw 724 to cut, melt and smelt the plastic particles when the plastic material is put into the material meter pipe 725 by the hopper 728 for forming the melt. After the check shaft 722 opened, the melt is driven to the material injection pipe 711 of the injection device 71 via the runner 723. At the same time, the injection rod 713 synchronously moves backward to a predetermined injection start position. A load cell 714 arranged at a rear portion of the injection rod 713 meter a back pressure of the melt. Once the melt reaches the predetermined position and pressure, the check shaft 722 is closed so as to finish the meter.

After the meter, each of the injection motors 718 (in the present embodiment, there are two injection motors) synchronously rotates the linked guide screw 7151. The guide screw 7151 is rotate to generate movement relative to the nut 7153, further drives the injection linkage member 732 to linearly move, and synchronously drives the injection rod 713 to move within the material injection pipe 711 for achieving the forward movement for injection and the backward movement for measurement.

Besides the advantages of the first embodiment, the configuration of the second embodiment employs a design of the base 73 and the injection motors 718 secured to the front side of the base 73, which not only simplifies the structure and saves the space of the base 73, but also saves the space at the rear side for arranging the injection motors 718. Thus the second embodiment saves more space compared to the first embodiment, and relatively shortens the length of the injection molding machine, which better meets the application requirements of large-scale injection molding machine.

Compared to the prior arts, the injection unit of the two-stage injection molding machine of the present invention mainly employ the design of securing the injection motors of the injection device, which does not move along with the injection linkage member, to the base, so as to decrease the movement momentum and improve the injection response and acceleration capability. Additionally, the injection device can adopt a plurality of injection motors to meets the injection capability requirement without using high power injection motors, and relatively shorten the length of the injection molding machine. Besides the injection motor and meter motor are employed to respectively perform injection and meter, the design of check shaft can be employed to prevent the adverse flow of the plastic material caused by the injection, which relatively improves the precise of the amount of injection of the plastic material, thus the problem of the prior arts is solved.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. An injection unit of a two-stage injection molding machine, comprising:
   an injection device comprising a hollow base having a first side and an second side opposite to the first side, an material injection pipe secured to the first side and having an injection rod, an injection linkage member arranged inside the hollow base and linking the injection rod, and at least an injection motor secured to the second side for driving the injection linkage member; and
   a meter device comprising a material meter pipe haying a meter screw and for linking the material injection pipe, and a meter motor secured to the second side for driving the meter screw.

2. The injection unit as claimed in claim 1, wherein the meter device further comprises a runner linking the material meter pipe and the material injection pipe.

3. The injection unit as claimed in claim 2, wherein the meter device further comprises a check shaft arranged in the runner for preventing adverse flow.

4. The injection unit as claimed in claim 1, wherein the meter device further comprises a hopper for providing plastic to the material meter pipe.

5. The injection unit as claimed in claim 1, wherein the injection motor of the injection device comprises a plurality of injection motors secured to the second side for synchronously driving the injection linkage member.

6. The injection unit as claimed in claim 5, wherein the injection motor drives the injection linkage member via a transmission mechanism.

7. The injection unit as claimed in claim 6, wherein the transmission mechanism at least comprises a guide screw linking the injection motor, and a nut fixedly arranged on the injection linkage member and engaging with the screw.

8. The injection unit as claimed in claim 7, wherein the transmission mechanism further comprises a coupling for linking the injection motor and the guide screw.

9. The injection unit as claimed in claim 7, wherein the guide screw is a ball screw, and the nut is a ball screw nut.

10. The injection unit as claimed in claim 1, wherein the injection motor drives the injection linkage member via a transmission mechanism.

11. The injection unit as claimed in claim 10, wherein the transmission mechanism at least comprises a guide screw linking the injection motor, and a nut fixedly arranged on the injection linkage member and engaging with the screw.

12. The injection unit as claimed in claim 11, wherein the transmission mechanism further comprises a coupling for linking the injection motor and the guide screw.

13. The injection unit as claimed in claim 11, wherein the guide screw is a ball screw, and the nut is a ball nut.

14. The injection unit as claimed in claim 1, wherein the injection motor is motor.

15. The injection unit as claimed in claim 1, wherein the first side of the hollow base is a front plate arranged at a front side, and the second side is a rear plate arranged at a rear side.

16. The injection unit as claimed in claim 1, wherein the injection rod extends through the first side of the hollow base and links the injection linkage member in the hollow base.

17. The injection unit as claimed in claim 1, wherein the injection device comprises a plurality of material injection pipes secured to the first side and having a plurality of injection rods, each of the injection rods of the material injection pipe links the injection linkage member.

18. An injection unit of a two-stage injection molding machine, comprising:
an injection device comprising a base, a material injection pipe secured to a front side of the base and having an injection rod, an injection linkage member arranged at a rear side of the base and linking the injection rod, and at least an injection motor secured to the front side of the base for driving the injection linkage member; and
a meter device comprising a material meter pipe having a meter screw and for linking the material injection pipe, and a meter motor secured to the rear side of the base for driving the meter motor of the meter screw.

19. The injection unit as claimed in claim 18, wherein the meter device further comprises a runner linking the material meter pipe and the material injection pipe.

20. The injection unit as claimed in claim 19, wherein the meter device further comprises a check shaft arranged in the runner for preventing adverse flow.

21. The injection unit as claimed in claim 18, wherein the meter device further comprises a hopper for providing plastic to the material meter pipe.

22. The injection unit as claimed in claim 18, wherein the injection motor of the injection device comprises a plurality of injection motors secured to the front side of the base, and each of the injection motors synchronously drives the injection linkage member.

23. The injection unit as claimed in claim 22, wherein the injection motor drives the injection linkage member via a transmission mechanism.

24. The injection unit as claimed in claim 23, wherein the transmission mechanism at least comprises a guide screw linking the injection motor, and a nut fixedly arranged on the injection linkage member and engaging with the screw.

25. The injection unit as claimed in claim 24, wherein the transmission mechanism further comprises a coupling for linking the injection motor and the guide screw.

26. The injection unit as claimed in claim 24, wherein the guide screw is a ball screw, and the nut is a ball screw nut.

27. The injection unit as claimed in claim 18, wherein the injection motor drives the injection linkage member via a transmission mechanism.

28. The injection unit as claimed in claim 27, wherein the transmission mechanism at least comprises a guide screw linking the injection motor, and a nut fixedly arranged on the injection linkage member and engaging with the screw.

29. The injection unit as claimed in claim 28, wherein the transmission mechanism further comprises a coupling for linking the injection motor and the guide screw.

30. The injection unit as claimed in claim 28, wherein the guide screw is a ball screw, and the nut is a ball screw nut.

31. The injection unit as claimed in claim 18, wherein the injection motor is motor.

32. The injection unit as claimed in claim 18, wherein the injection rod extends through the base to the rear side and links the injection linkage member at the rear side of the base.

33. The injection unit as claimed in claim 18, wherein the injection device comprises a plurality of material injection pipes secured to the front side of the base and having a plurality of injection rods, each of the injection rods of the material injection pipe links the injection linkage member.

* * * * *